US006944607B1

(12) United States Patent
Zhang et al.

(10) Patent No.: US 6,944,607 B1
(45) Date of Patent: Sep. 13, 2005

(54) AGGREGATED CLUSTERING METHOD AND SYSTEM

(75) Inventors: Bin Zhang, Fremont, CA (US); Meichun Hsu, Los Altos Hills, CA (US); Igor Kleyner, Pacifica, CA (US)

(73) Assignee: Hewlett-Packard Development Compnay, L.P., Houston, TX (US)

( * ) Notice: Subject to any disclaimer, the term of this patent is extended or adjusted under 35 U.S.C. 154(b) by 435 days.

(21) Appl. No.: 09/684,488

(22) Filed: Oct. 4, 2000

(51) Int. Cl.$^7$ ................................................ G06F 7/00
(52) U.S. Cl. ...................... 707/2; 707/104.1; 706/20
(58) Field of Search ........................... 707/2, 6, 7, 100, 707/104.1; 706/20

(56) References Cited

U.S. PATENT DOCUMENTS

| | | | | |
|---|---|---|---|---|
| 5,170,466 A | * | 12/1992 | Rogan et al. | ............... 707/530 |
| 5,263,120 A | * | 11/1993 | Bickel | ......................... 706/62 |
| 5,404,561 A | * | 4/1995 | Castelaz | ..................... 712/17 |
| 5,619,709 A | * | 4/1997 | Caid et al. | ..................... 707/2 |

(Continued)

OTHER PUBLICATIONS

NN9301473, Techniques for Improving Multi–partitioning Algorithm. IBM Technical Disclosure Bulletin, Jan. 1993, US vol. 36 Issue 1. p. No. 473–477.*

Forgy Edward. Cluster Analysis of Multivariate Data: Efficiency vs. Interpretability of Classifications. University of California, Los Angeles, Biometrics, Sep. 1965 pg 768–769.*

T. Wakahara and K. Ogura, "Extended Mean Shift in Handwriting Clustering," Proc. of 14th International Conference on Pattern Recognition (ICPR'98), vol. 1, pp. 384–388, Brisbane, Aug. 1998. □□.*

J. MacQueen. Some methods for classi cation and analysis of multivariate observations. In Proceedings of the 5th Berkeley Symposium on Mathematical Statistics and Probability, pp. 281–297, 1965. □□ □□.*

J. MacQueen, "Some Methods for Classification and Analysis of Multivariate Observations," Fifth Berkeley Symposium on Mathematical Statistics and Probability, vol. 1, University of California Press, Berkeley, 1967, pp. 281–297.

S. Z. Selim et al., "K–Means–Type Algorithms: A Generalized Convergence Theorem and Characterization of Local Optimality," IEEE Transactions on Pattern Analysis and Machine Intelligence, vol. PAM1–6, No. 1, Jan. 1984, pp. 81–87.

*Primary Examiner*—Kim Vu
*Assistant Examiner*—Monplaisir Hamilton (57) ABSTRACT

An aggregated data clustering method and system. First, the data points to be clustered and a size parameter are received. The size parameter specifies the number of data points to be moved at one time in the clustering algorithm. Next, the data points are clustered by using an aggregated clustering algorithm (e.g., aggregated local K-Means clustering algorithm) and the size parameter to generate clustered results. Then, a determination is made whether or not the clustered results are satisfactory. If the clustered results are satisfactory, the clustering is stopped. Otherwise, a modified or refined parameter size is received. Then, clustering is performed on the clustered results generated previously by using the aggregated clustering algorithm and the revised or refined parameter size. The steps of determining, modifying the parameter size, and aggregated clustering are repeated until satisfactory clustering results are achieved.

25 Claims, 4 Drawing Sheets

U.S. PATENT DOCUMENTS

| | | | | |
|---|---|---|---|---|
| 5,717,915 | A | * | 2/1998 | Stolfo et al. .................... 707/5 |
| 5,809,490 | A | * | 9/1998 | Guiver et al. ................. 706/16 |
| 5,832,182 | A | * | 11/1998 | Zhang et al. ............... 707/101 |
| 5,933,818 | A | * | 8/1999 | Kasravi et al. .............. 706/12 |
| 5,935,270 | A | * | 8/1999 | Lin ........................... 714/795 |
| 5,970,495 | A | * | 10/1999 | Baru et al. ................. 707/102 |
| 5,983,224 | A | * | 11/1999 | Singh et al. .................... 707/3 |
| 6,003,029 | A | * | 12/1999 | Agrawal et al. ............... 707/1 |
| 6,012,058 | A | * | 1/2000 | Fayyad et al. ................. 707/2 |
| 6,049,797 | A | * | 4/2000 | Guha et al. .................... 707/6 |
| 6,092,072 | A | * | 7/2000 | Guha et al. ................. 707/100 |
| 6,115,708 | A | * | 9/2000 | Fayyad et al. ................. 707/6 |
| 6,269,376 | B1 | * | 7/2001 | Dhillon et al. ............. 707/101 |
| 6,374,251 | B1 | * | 4/2002 | Fayyad et al. ............. 707/101 |
| 6,411,964 | B1 | * | 6/2002 | Iyer et al. ................... 707/200 |
| 6,421,668 | B1 | * | 7/2002 | Yakhini et al. ................. 707/6 |
| 6,437,804 | B1 | * | 8/2002 | Ibe et al. .................... 709/223 |
| 6,564,202 | B1 | * | 5/2003 | Schuetze et al. ............... 707/2 |

* cited by examiner

AGGREGATED CLUSTERING METHOD AND SYSTEM

FIELD OF THE INVENTION

The present invention relates generally to data clustering and more specifically to a method and system for aggregated data clustering.

BACKGROUND OF THE INVENTION

Data clustering operates to group or partition a plurality of data points into a predetermined number of clusters or categories based on one or more attributes or features. The efficiency of a clustering algorithm depends on several factors. First, the computation resources required to implement the clustering algorithm is an important consideration. It is generally desirable to reduce the time needed to generate results (often referred to as the convergence rate) and also reduce the amount of computer resources needed to implement the clustering algorithm. Furthermore, as explained in greater detail hereinafter, the prior art methods do not have a very efficient convergence rate.

Second, the quality of the generated clusters or categories (often referred to as the convergence quality) is also another important consideration. Ideally, there is one center point for each category or cluster. Unfortunately, the prior art methods often generate clusters or categories with more than one center. These centers are referred to as "trapped centers" (i.e., these centers are trapped by the local data, but actually belong to another cluster or category). There are many practical and useful applications that can utilize data clustering to improve results. Consequently, there is much interest in developing clustering algorithms or methods that efficiently and effectively cluster data.

PRIOR ART DATA CLUSTERING METHODS

K-Means is a well-known prior art method for data clustering. The K-Means clustering algorithm is further described in J. MacQueen, "Some Methods for Classification and Analysis of Multivariate Observations," pages 281–297 in: L. M. Le Cam & J. Neyman [eds.] Proceedings of the Fifth Berkeley Symposium on Mathematical Statistics and Probability, Vol. 1, University of California Press, Berkeley, 1967 and Shokri Z. Selim and M. A. Ismail, "K-Means Type of Algorithms: A Generalized Convergence Theorem and Characterization of Local Optimality," IEEE Transactions on Pattern Analysis and Machine Intelligence, Vol. PAMI-6, No.1, 1984. Unfortunately, both of these approaches are limited to moving a single data point at one time from one cluster to a second cluster.

Data points do not "move" in the physical sense, but each data point's membership in a particular cluster, which is defined by a center point, changes. For example, when a data point that is a member in a first cluster is "moved" to a second cluster, a performance function is evaluated based on the data points and center points before and after the move. One aspect of the clustering algorithm is to determine whether such a "move" reduces the performance function (i.e., whether the "move" improves the clustering results).

It is to be appreciated that moving one data point at a time between two clusters is inefficient especially when many thousands, tens of thousands of data points, or more need to be moved. One can analogize this situation with a more common example of negotiating the best price for an automobile.

Consider an example when a seller and a buyer are separated by a difference of five thousand dollars between an initial offer price (e.g., $10,000) and a counter offer price (e.g., $15,000). During this stage of the negotiations, it would be very inefficient if the buyer's second offer is $10,000.01 and the seller counters with $14,999.99. In fact, if the negotiations where to continue one cent at a time, it is apparent that both the seller and buyer would be negotiating for a long time to come before reaching any type of agreement. Consequently, the speed at which an agreement is reached one cent at a time is very slow at best.

Instead, it would be more efficient, and one would expect the buyer in real life to move perhaps by a thousand dollars or more in the second offer by offering, for example, $11,000. Similarly, one would expect the seller to move perhaps a thousand dollars in a counter offer by countering with $14,000. Perhaps, when the buyer and seller were only one thousand dollars apart, the buyer and seller would then start negotiating in increments of hundreds of dollars. Similarly, when the buyer and seller were only one hundred dollars apart from reaching an agreement, both would begin to negotiate in increments of single dollars and then in cents.

The inefficient negotiation strategy of moving one cent at a time, regardless of how far apart the parties are, is comparable to what is currently being performed by prior art clustering methods. Since prior art methods are limited to moving a single data point per iteration, this is similar to negotiating on a per penny basis when in fact the parties (e.g., data points and center points) are thousands of dollars apart.

From the above example, it can be appreciated that a mechanism to move more than one data point at a time is desirable. Unfortunately, there is no mechanism for moving more than one data point at a time without losing precision. In fact, if the prior art approaches were to move than one point at a time, there is no method that exists to quantify the amount of error injected by moving more than one point at a time.

Accordingly, there remains a need for a method and system for data clustering that can move more than one data at a time without the loss of precision and that overcomes the disadvantages set forth previously.

SUMMARY OF THE INVENTION

It is an object of the present invention to provide a clustering method and system that is capable of simultaneously moving more than one data point from a first cluster to a second cluster.

It is a further object of the present invention to provide a clustering method and system for moving more than one data point at a time from a first cluster to a second cluster while preserving the monotone convergence property (i.e., the property that the performance function decreases after every move that is made of data points between two clusters).

It is a further object of the present invention to provide a clustering method and system that provides a predetermined metric for evaluating the move of more than one data point between two clusters, where the predetermined metric includes the geometric center of the set of data points currently being evaluated for move.

It is yet another object of the present invention to provide a clustering method and system that provides a procedure for updating the performance function without losing precision or using approximations.

An aggregated data clustering method and system. First, the data points to be clustered and a size parameter are received. The size parameter specifies the number of data points to be moved at one time in the clustering algorithm. Next, the data points are clustered by using an aggregated clustering algorithm (e.g., aggregated local K-Means clustering algorithm) and the size parameter to generate clustered results. Then, a determination is made whether or not the clustered results are satisfactory. If the clustered results are satisfactory, the clustering is stopped. Otherwise, a modified or refined parameter size is received. For example, a user can decrease the parameter size to reduce the number of data points that are moved from a first cluster to a second cluster at one time. Then, clustering is performed on the clustered results generated previously by using the aggregated clustering algorithm and the revised or refined parameter size. The steps of determining, modifying the parameter size, and aggregated clustering are repeated until satisfactory clustering results are achieved.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. The following description and the drawings are illustrative of the invention and are not to be construed as limiting the invention.

DATA CLUSTERING APPLICATION

Before delving into the details of the aggregated clustering method and system of the present invention, an exemplary application is first described to familiarize the reader with concepts related to the invention.

As noted previously, clustering seeks to locate dense regions of data that have similar attributes or features and generate categories or clusters of these "similar" data points. These attributes or features can be a qualitative (e.g., similar behavior, tastes, likes, dis-likes of consumers), or a quantitative measure (e.g., the number of items purchased by customers across a predefined time period).

Figure 1:
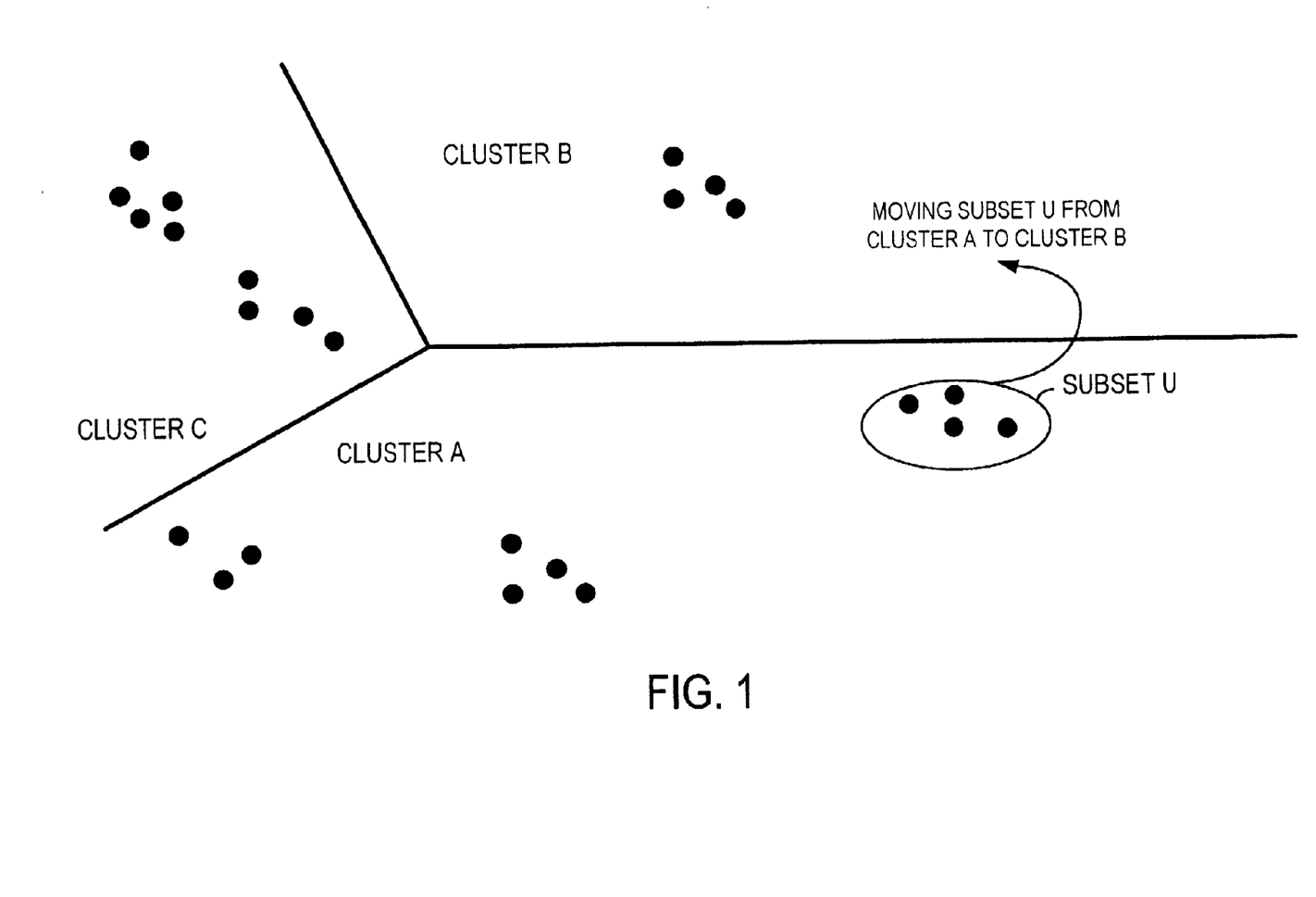
FIG. 1 is an exemplary set of data points that are grouped into a plurality of clusters and that can be the input to the aggregated clustering method of the present invention.

FIG. 1 is an exemplary set of data points that are grouped into a plurality of clusters that can be the input to the aggregated clustering method of the present invention. As a departure from prior art clustering methods, the aggregated clustering method and system of the present invention moves more than a single data point at one time during the clustering (i.e., changes membership of more than one data point from a first cluster to a second cluster at one time). Specifically, the aggregated clustering method of the present invention can move a plurality of data points, such as a subset U, from a first cluster (e.g., cluster A) to a second cluster (e.g., cluster B) at one time without the loss of precision. In fact, as explained in greater detail hereinafter, a user can flexibly specify the number of data points in the subset U to be moved at one time by using an input referred to as a parameter size.

For example, the set of data points can represent a plurality of car brokers or dealers. This exemplary application uses two attributes or features for the clustering. The first attribute is the number of sedans that the particular dealer has sold in the last year, and the second attribute is the number of sports cars, the particular dealer has sold in the last year.

This particular application seeks to group the car dealers into clusters, such as a first cluster (e.g., cluster A) of car dealers that are particularly good at selling sedans, a second cluster (e.g., cluster B) of car dealers that are particularly good at selling sports cars, and perhaps a third cluster (e.g., cluster C) of car dealers that are good at selling both sports cars and sedans.

Center-based clustering algorithms operate by receiving the number of desired clusters, initialization information (e.g., the random initial positions of centers), and based thereon generates center points that are at the center of clusters of data. In this case, since there are three desired clusters, three center points with initial points are provided to the clustering algorithm.

Ideally, a good clustering method moves the center positions to the three clusters of data (i.e., a first center is moved to the center of those car dealers that sell high numbers of sedans, a second center is moved to the center of those car dealers that sell high numbers of sports cars, and a third center is moved to the center of the car dealers that sell a high number of both sports cars and sedans.

Clustering Method

Figure 2:
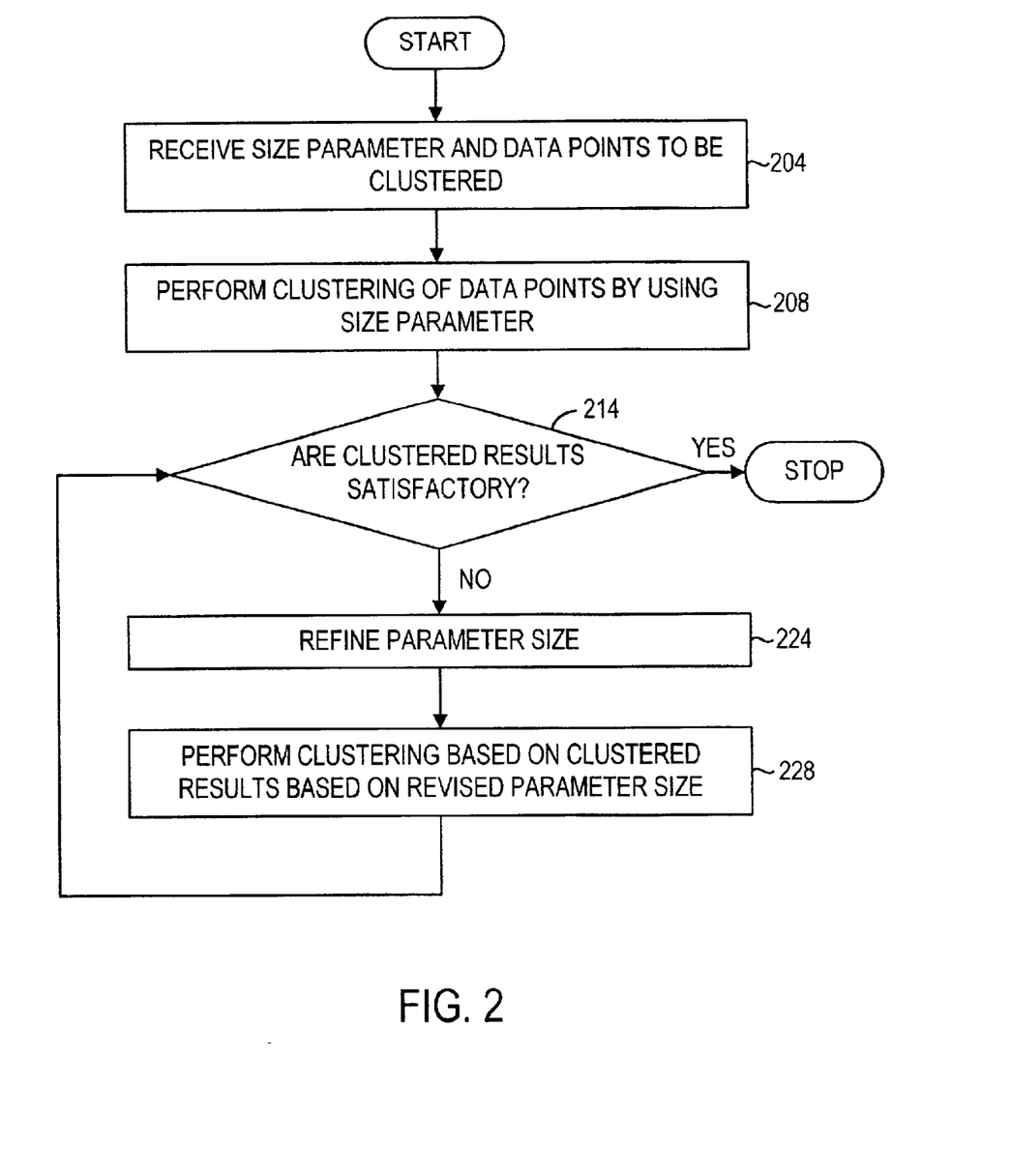
FIG. 2 is a flowchart illustrating an aggregated clustering method according to one embodiment of the present invention.

FIG. 2 is a flowchart illustrating an aggregated clustering method according to one embodiment of the present invention. In step 204, the data points to be clustered and a size parameter are received. The size parameter specifies the number of data points to be moved at one time in the clustering algorithm. In step 208, the data points are clustered using the size parameter to generate clustered results.

In step 214, a determination is made whether of not the clustered results generated in step 208 are satisfactory. A determination of whether results are satisfactory can vary across applications and depend on the specific requirements of the particular application. Typically, one or more well-known metrics is utilized to determine if the clustered results meet a particular requirement. Steps 208 and 214 are described in greater detail hereinafter with reference to FIG. 3.

When the clustered results are satisfactory, the clustering stops. Otherwise, when the clustered results are not satisfactory, a modified or refined parameter size is received. For example, a user can decrease the parameter size to reduce the number of data points that are moved from a first cluster to a second cluster at one time. By so doing, the granularity of the clustering is increased. One advantage of the present invention is that the user can flexibly select or vary the size parameter to suit a particular clustering application. For example, with a large data set, a user can set the size parameter at a large value such as 1000 for the first iteration, a smaller value, such as 500 for the second iteration, a yet smaller value, such as 100 in a third iteration, etc. In this manner, the aggregated clustering of the present invention allows a user to selectively adjust the granularity of the clustering for each iteration, thereby increasing the efficiency and convergence rate of the clustering.

Furthermore, since the user is not limited to moving a single data point at one time as in the prior art clustering methods, the present invention provide the user the ability to tailor the granularity of the clustering based on the requirements of a particular application.

In step 228, clustering is performed on the clustered results generated by step 208 by using the revised or refined parameter size. Steps 214 through step 228 are repeated until satisfactory clustering results are achieved.

Aggregated Clustering System 400

Figure 4:
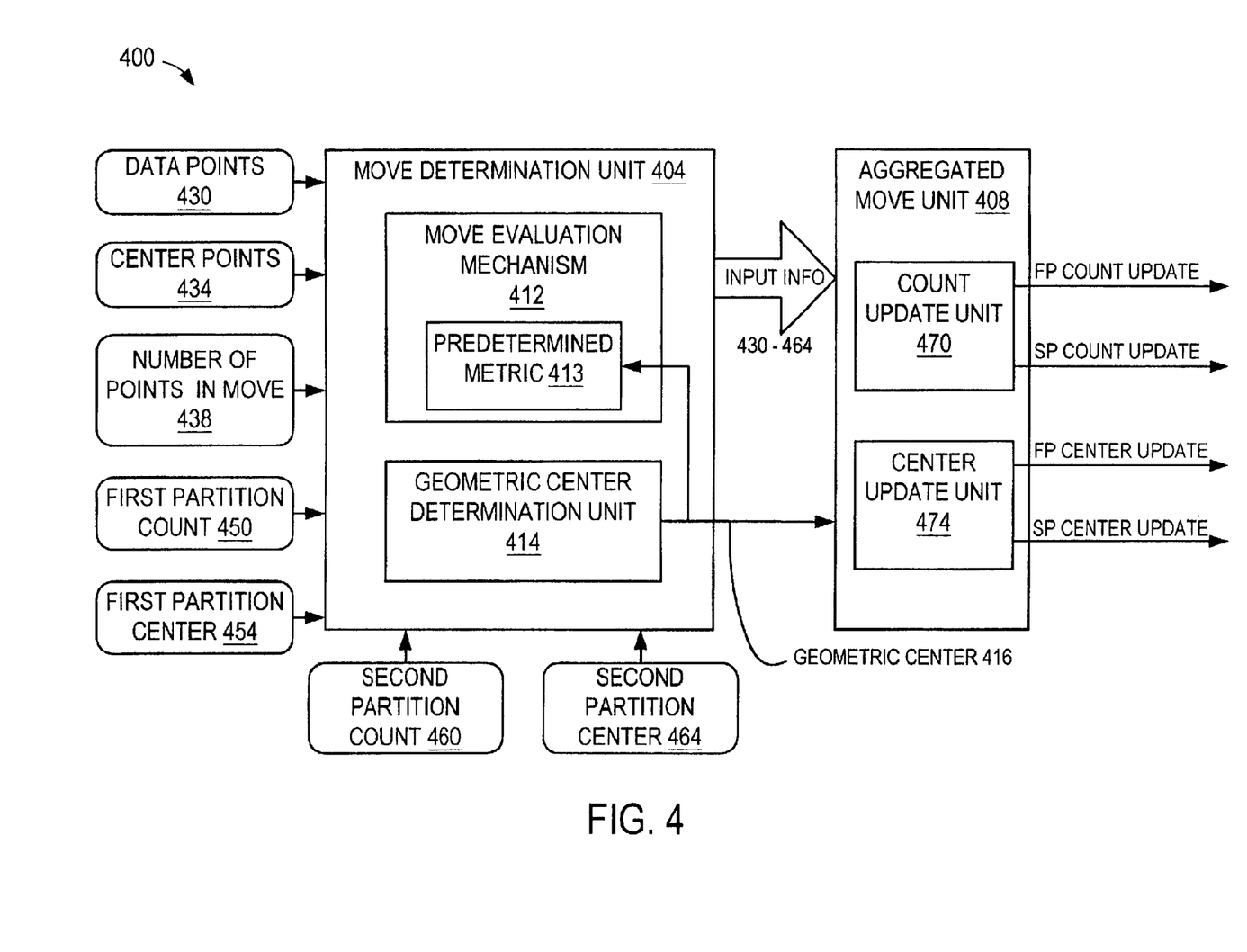
FIG. 4 is a block diagram illustration of an aggregated clustering system configured in accordance with one embodiment of the present invention.

FIG. 4 illustrates an aggregated clustering system 400 that is configured in accordance with one embodiment of the present invention. The aggregated clustering system 400 includes a move determination unit 404 for evaluating whether an aggregated move of the specified number of data points at one time is possible and enhances the clustering results. The system 400 also includes an aggregated move unit 408 that is coupled to the move determination unit 404 to receive a geometric center 416 of the current set of data points and input information. For example, the move unit 408 updates the first partition count 450, the second partition count 460, the first partition center 454, and the second partition center 464 as described in greater detail hereinafter. Based on these inputs, the move unit 408 accomplishes the move from a first cluster to a second cluster after the move determination unit 404 determines that the aggregated move is needed.

The move determination unit 404 includes a first input for receiving the data points 430 that are partitioned into a plurality of initial partitions and a second input for receiving center points 434. As described in greater detail hereinafter, the partitions, center points of the partitions, and the number of data points in each partition (i.e., the count for each partition) may be updated for each iteration of the clustering in accordance with teachings of the present invention. The move determination unit 404 also includes a third input for receiving the parameter size 438 (i.e., the number of data points to move at one time), a fourth input for receiving information concerning the first partition (i.e., the move from partition) and the second partition (i.e., the move to partition). For example, this information can include the current count 450 of the first partition, the current center 454 of the first partition, the current count 460 of the second partition, and the current center 464 of the second partition.

The move determination unit 404 includes a move evaluation mechanism 412 for evaluating whether a set of data points should be moved from a first cluster to a second cluster. Preferably, the move evaluation mechanism 412 utilizes a predetermined metric 413 for performing the move evaluation. As described in greater detail hereinafter, the predetermined metric 413 can employ a geometric center of the data points considered for move.

The move determination unit 404 also includes a geometric center determination unit 414 for generating the geometric center of the data points to be moved at one time based on the data points in the partitions. As noted previously, the move determination unit 404 uses the geometric center in the move evaluation of a current set of data points. For example, the predetermined metric can include the geometric center of the set of data points evaluated for move. The geometric center of data points is also provided to the aggregated move unit 408 for use in updating the partitions.

The aggregated move unit 408 includes a count update unit 470 for updating the count of the first partition and count of the second partition to accurately reflect the partition counts after the aggregated move. The aggregated move unit 408 also includes a center update unit 474 for updating the center of the first partition and center of the second partition to accurately reflect the partition centers after the aggregated move.

For example, the count update unit 470 adjusts the count for the Move_From partition and the count for the Move_To partition to generate a first partition (FP) count update and second partition (SP) count update, respectively. Specifically, the count for the Move_From partition is decremented by the number of data points involved in the move. Similarly, the count for the Move_To partition is incremented by the number of data points involved in the move. The center update unit 474 adjusts the center of the Move_From partition and the center of the. Move_To partition to generate, for example, first partition (FP) center update and second partition (SP) center update, respectively. Specifically, the center for the Move_From partition is calculated by using the geometric center of the data points that are being moved. Similarly, the center for the Move_To partition is calculated by using the geometric center of the data points that are being moved.

These updated partition counts and centers for the first partition and the second partition are then provided to the move determination unit 404 for further move evaluation processing should the current iteration generate clustered results that are not satisfactory.

The aggregated clustering method and system of the present invention moves more than one data point at a time from a first cluster to a second cluster while preserving the monotone convergence property. The monotone convergence property is the property that the performance function decreases after every move that is made of data points between two clusters.

Figure 3:
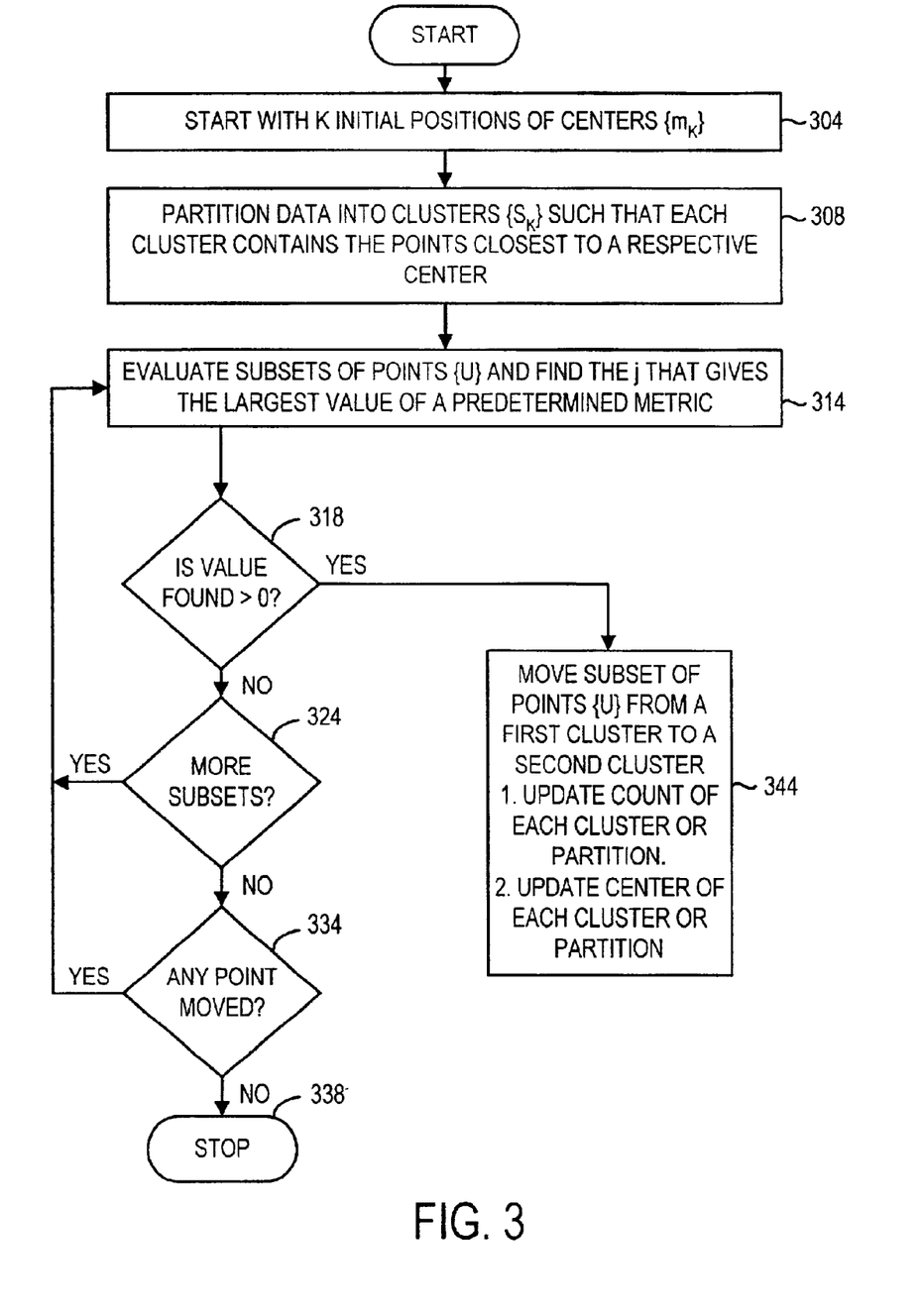
FIG. 3 is a flowchart illustrating in greater detail certain steps of the flowchart of FIG. 2.

Aggregated Clustering FIG. 3 is a flowchart illustrating in greater detail an aggregated clustering method of according to one embodiment of the present invention. In step 304, K initial center positions are received. Each center is denoted by $m_k$ where k=1, . . . , K, where K is the number of clusters (which is herein referred to also as "partitions"). The number of clusters or partitions can be specified by and adjusted by a user to suit a particular application by setting a size parameter variable. The initial center points can be random points or the output of some initialization algorithm, which are generally known by those of ordinary skill in the art.

In step 308, a plurality of data points are received and partitioned into a plurality of clusters based on the distance of the data point from a center point of a respective cluster. Each cluster has a center point, and each data point is placed into one of the clusters $\{S_K\}$ based on a relationship (e.g., the Euclidean distance) between the center point and the data point.

In step 314, at least two data point in a first partition $S_i$ (e.g., cluster A) are simultaneously evaluated for moving to every other partition (e.g., cluster C and cluster B). For For example, subsets of U points are evaluated by an evaluation expression provided herein below. For example, in the example given in FIG. 1, the size parameter is equal to four. All possible combinations or subsets having four data points from the total eleven data points in cluster A are evaluated for move to cluster B or cluster C.

The index i is utilized to represent the partition to which a data point x currently belongs or is a member of, and the index j is utilized to represent the partition that is currently being evaluated for a potential move to which the data point x can be moved. This embodiment of the present invention provides the following predetermined metric for evaluating whether a set of data points should be moved from the current partition to a proposed or potential partition:

$$\frac{n_i}{n_i - |U|}|m_u - m_i|^2 - \frac{n_i}{n_j + |U|}|m_u - m_j|^2$$

where U is the subset of data points (U is a subset of $S_i$) being evaluated for the move, |U| is the size of U that is specified by the size parameter, $m_u$ is the geometric center of U, $m_i$ and $m_j$ are the centers of the clusters and $n_i$ and $n_j$ are the counts of the clusters.

In decision block 318, a determination is made whether the value generated in step 314 is greater than zero. When the generated value is greater than zero, processing proceeds to step 344. In step 344, the set of data points U is moved from a current partition $S_i$ to a second partition $S_j$. Moving the set of data points from a current partition to a second partition can involve the following sub-steps. First, the count of each partition needs to be updated. Second, since the membership of both the partitions are changing (i.e., the data points are being moved from the Move_From partition to the Move_From partition), the centers of these partitions need to be updated and re-calculated. For accomplishing the move U from $S_i$ to $S_j$, the count of each partition and the center of each partition needs to be re-calculated to accurately reflect the addition of new data points or the deletion of old data points as the case may be.

For updating the counts of the two partitions, the following expressions can be employed:

$n_i = n_i - |u|$, and $n_j = n_j + |u|$.

For updating the centers of these two partitions, the following expressions can be employed:

$m_i = (n_i * m_i - m_u)/(n_i - |u|)$, and $m_j = (n_j * m_j + m_u)/(n_j - |u|)$.

If the value generated in step 314 is not greater than zero, processing proceeds to decision block 324, where a determination is made whether there are more data points to be checked. If there are more data points to be checked, then processing proceeds to step 314.

If there are no more data points to be checked, then processing proceeds to decision block 334. Steps 314, 318, 324, and 344 form a single iteration of the processing. In decision block 334, a determination is made whether any data points were moved (i.e., changed membership in partitions). When no data points are moved (i.e., when no data point changes membership in the partitions), then the processing is complete and stops (step 338). When one or more data points were moved (i.e., at least one data point changed membership in partitions), then processing proceeds to step 314 to process another iteration (i.e., steps 314, 318, 324 and 344).

Alternatively, decision block 334 can have a different stop or termination condition. The stop condition can be whether the change in the performance function is less than a predetermined value.

There are numerous applications that can utilize the aggregated clustering method and system of the present invention to cluster data. For example, these applications include, but are not limited to, data mining applications, customer segmentation applications, document categorization applications, scientific data analysis applications, data compression applications, vector quantization applications, and image processing applications.

The foregoing description has provided examples of the present invention. It will be appreciated that various modifications and changes may be made thereto without departing from the broader scope of the invention as set forth in the appended claims.

What is claimed is:

1. A system for clustering data comprising:
   a computer executing a computer program performing at least the following:
   receiving into the computer a plurality of data points for clustering;
   receiving into the computer a size parameter for specifying the number of data points to be simultaneously evaluated for inclusion in a cluster;
   clustering the data points by using the size parameter to generate clustered results by evaluating subsets of data points in each cluster for moving into every other cluster by using a predetermined metric, wherein the number of data points in a subset is specified by the size parameter;
   determining whether the clustered results are satisfactory;
   when the clustered results are satisfactory, stop clustering;
   otherwise when the clustered results are not satisfactory, revise the size parameter, perform clustering based on the revised size parameter and the clustered results, and proceed to determining whether the clustered results are satisfactory.

2. The system as defined in claim 1 wherein the predetermined metric of the computer program comprises the following expression:

$$\frac{n_i}{n_i - |U|}|m_u - m_i|^2 - \frac{n_i}{n_j + |U|}|m_u - m_j|^2$$

where U is the subset of data points being evaluated for the move, |U| is the size of U that is specified by the size parameter, $m_u$ is the geometric center of U, $m_i$ and $m_j$ are the centers of the clusters and $n_i$ and $n_j$ are the counts of the clusters.

3. The system as defined in claim 1 wherein evaluating subsets further comprises:
   determining a geometric center of the subset of data points being evaluated for a move;
   using the geometric center of the subset of data points and the predetermined metric to generate a value.

4. The system as defined in claim 3 wherein evaluating subsets further comprises:
   determining whether the value is greater than zero;
   when the value is greater than zero, moving the subset of data points from a Move_From cluster to a Move_To cluster;
   when the value is not greater than zero, determining if there are more subsets to evaluate;
   when there are more subsets to evaluate, proceeding to evaluating the subsets;
   when there are no more subsets to evaluate, determining whether any point has moved;

when a point has moved, proceeding to evaluating the subsets; and when no point has moved, stopping the processing.

5. The system as defined in claim 4 wherein moving the subset of data points from a Move_From cluster to a Move_To cluster further comprises:

updating the count of the Move_From cluster;

updating the center of the Move_From cluster;

updating the count of the Move_To cluster;

updating the center of the Move_To cluster.

6. The system as defined in claim 4, further comprising:

wherein each data point has a membership with one cluster; and wherein moving the subset of data points from a Move_From cluster to a Move_To cluster further comprises simultaneously updating the membership of at least two data points from the membership of the Move_From cluster to the membership of the Move_To cluster.

7. The system as defined in claim 1 wherein revising the size parameter comprises decreasing the size parameter.

8. The system as defined in claim 1 wherein the system is utilized in one of a data mining application, customer segmentation application, document categorization application, scientific data analysis application, data compression application, vector quantization application, and image processing application.

9. The system as defined in claim 1 wherein determining whether the clustered results are satisfactory further comprises:

determining whether a change in a performance function is less than a predetermined value.

10. A computer-implemented method for clustering data points, comprising:

receiving a plurality of data points in a computer system;

partitioning the plurality of data points into a plurality of clusters wherein each data point is a member of one cluster of the plurality of clusters;

evaluating a plurality of data points in a first cluster of the plurality of clusters for moving into every other cluster of the plurality of clusters, wherein the number of data points evaluated is determined by a size parameter; and moving the plurality of data points simultaneously from the first cluster to a second cluster if the determination is that the plurality of data points should be moved.

11. The computer-implemented method of claim 10, further comprising:

receiving the size parameter that specifies a number of data points, wherein the plurality of data points in a first cluster comprises the number of data points specified by the size parameter.

12. The computer-implemented method of claim 11, wherein the predetermined metric comprises the following expression:

$$\frac{n_i}{n_i - |U|} |m_u - m_i|^2 - \frac{n_i}{n_j + |U|} |m_u - m_j|^2$$

wherein U is the plurality of data points being evaluated, |U| is a size of U that is specified by the size parameter, $m_u$ is a geometric center of U, $m_i$ and $m_j$ are geometric centers of the first cluster and the second cluster, and $n_i$ and $n_j$ are counts of the first cluster and the second cluster.

13. A system for clustering data points comprising:

a computer that stores a plurality of data points for clustering;

means for partitioning the plurality of data points into a plurality of clusters;

means for evaluating an aggregated move of subsets of data points in a first cluster of the plurality of clusters for moving into every other cluster of the plurality of clusters, wherein the number of data points in each subset is determined by a size parameter; and means for performing the aggregated move of the subset of data points to a second cluster responsive to the results of the evaluation means.

14. The system of claim 13, wherein the predetermined metric comprises the expression:

$$\frac{n_i}{n_i - |U|} |m_u - m_i|^2 - \frac{n_i}{n_j + |U|} |m_u - m_j|^2$$

wherein U is the subset of data points being evaluated, |U| is a size of U that is specified by the size parameter, $m_u$ is a geometric center of U, $m_i$ and $m_j$ are geometric centers of the first cluster and the second cluster, and $n_i$ and $n_j$ are counts of the first cluster and the second cluster.

15. The system of claim 13, wherein the means for evaluating receives a size parameter that determines the number of data points included in the subset.

16. The system of claim 13, wherein the means for evaluating includes means for generating a geometric center of the subset of data points based on a first plurality of data points in the first cluster and a second plurality of data points in the second cluster.

17. The system of claim 13, wherein the means for performing an aggregated move includes means to simultaneously move the data points in the subset of data points from the first cluster to the second cluster.

18. The system of claim 13, wherein the means for performing an aggregated move includes means to determine a geometric center of the first cluster and a geometric center of the second cluster after the subset of data points is moved, wherein a geometric center of the subset of data points is used in the determination.

19. A computer-implemented method for clustering data points comprising:

receiving in a computer system a plurality of data points for clustering;

partitioning the plurality of data points into a plurality of clusters; and repartitioning the plurality of data points among the plurality of clusters, wherein repartitioning comprises:

using a predetermined metric to evaluate subsets of data points in each cluster of the plurality of clusters for moving into every other cluster of the plurality of clusters, wherein the number of data points in each subset is determined by a size parameter; and moving data points in a subset of data points simultaneously from a first cluster of the plurality of clusters to a second cluster of the plurality of clusters if the evaluation of the subset determines that the subset should be moved into the second cluster.

20. The computer-implemented method of claim 19, further comprising determining whether the repartitioning is satisfactory;

if the repartitioning is not satisfactory, performing:

changing the size parameter;

repartitioning the plurality of data points; and determining whether the repartitioning is satisfactory until the repartitioning is satisfactory.

21. The computer-implemented method of claim 20, wherein determining whether the repartitioning is satisfactory comprises determining whether at least one data point was moved during the repartitioning.

22. The computer-implemented method of claim 20, wherein determining whether the repartitioning is satisfactory comprises determining whether a change in a performance function is less than a predetermined value.

23. The computer-implemented method of claim 19, wherein moving data points in a subset of data points simultaneously further comprises:

updating counts of the first cluster and the second cluster; and recalculating geometric centers of the first cluster and the second cluster.

24. The computer-implemented method of claim 19, wherein the predetermined metric is computed using at least the size parameter, geometric centers of the subset being evaluated, the first cluster, and the second cluster, and counts of the first cluster and the second cluster.

25. A system for clustering data comprising:

a computer executing a computer program performing at least the following:

receiving into the computer a plurality of data points for clustering;

receiving into the computer a size parameter for specifying the number of data points to be moved at one time;

clustering the data points by using the size parameter to generate clustered results;

determining whether the clustered results are satisfactory;

when the clustered results are satisfactory, stop clustering;

otherwise when the clustered results are not satisfactory, revise the size parameter, perform clustering based on the revised size parameter and the clustered results, and proceed to determining whether the clustered results are satisfactory, wherein clustering the data points further comprises:

evaluating subsets of data points in each cluster for moving into every other cluster by using a predetermined metric, wherein the number of data points in a subset is specified by the size parameter, wherein evaluating subsets further comprises:

determining a geometric center of the subset of data points being evaluated for a move;

using the geometric center of the subset of data points and the predetermined metric to generate a value;

determining whether the value is greater than zero;

when the value is greater than zero, moving the subset of data points from a Move_From cluster to a Move_To cluster;

when the value is not greater than zero, determining if there are more subsets to evaluate;

when there are more subsets to evaluate, proceeding to evaluating the subsets;

when there are no more subsets to evaluate, determining whether any point has moved;

when a point has moved, proceeding to evaluating the subsets; and when no point has moved, stopping the processing, wherein each data point has a membership with one cluster; and wherein moving the subset of data points from a Move_From cluster to a Move_To cluster further comprises simultaneously updating the membership of at least two data points from the membership of the Move_From cluster to the membership of the Move_To cluster.

* * * * *